US 10,400,871 B2

(12) United States Patent
Buchen et al.

(10) Patent No.: US 10,400,871 B2
(45) Date of Patent: Sep. 3, 2019

(54) BELT TENSIONING DEVICE (71) Applicant: Muhr und Bender KG, Attendorn (DE)

(72) Inventors: Thomas Buchen, Drolshagen (DE); Jan Diblik, Mokrovraty (CZ); Frederik Vollmer, Schmallenberg-Dorlar (DE)

(73) Assignee: Muhr und Bender KG, Attendorn (DE)

( * ) Notice: Subject to any disclaimer, the term of this patent is extended or adjusted under 35 U.S.C. 154(b) by 168 days.

(21) Appl. No.: 15/262,101

(22) Filed: Sep. 12, 2016

(65) Prior Publication Data

US 2017/0082176 A1   Mar. 23, 2017

(30) Foreign Application Priority Data

Sep. 17, 2015  (DE) .................. 10 2015 115 750

(51) Int. Cl.
*F16H 7/12*   (2006.01)
*F16H 7/08*   (2006.01)

(52) U.S. Cl.
CPC ......... *F16H 7/1281* (2013.01); *F16H 7/1218* (2013.01); *F16H 2007/081* (2013.01); *F16H 2007/0842* (2013.01); *F16H 2007/0865* (2013.01); *F16H 2007/0893* (2013.01)

(58) Field of Classification Search
CPC ....... F16H 2007/081; F16H 2007/0893; H01L 2924/0002; H01L 2924/00; H01L 23/3672
USPC ........................................................ 474/135
See application file for complete search history.

(56) References Cited

U.S. PATENT DOCUMENTS

| | | | | | |
|---|---|---|---|---|---|
| 3,725,840 | A | * | 4/1973 | Hesse .................... | H01R 13/71 439/335 |
| 4,307,954 | A | * | 12/1981 | Ludwig ................. | G03B 17/14 359/828 |
| 4,478,492 | A | * | 10/1984 | Ando ..................... | G03B 17/14 359/828 |
| 5,042,257 | A | * | 8/1991 | Kendrick ............... | F25B 21/02 136/203 |

(Continued)

FOREIGN PATENT DOCUMENTS

DE   19729994 A1   1/1999
DE   10333876 A1   2/2005

(Continued)

*Primary Examiner* — Henry Y Liu
(74) *Attorney, Agent, or Firm* — Bejin Bieneman PLC (57) ABSTRACT A belt tensioning device comprises a base member; at least one tensioning arm which, relative to the base member, is pivotably supported around a pivot axis; a tensioning roller for tensioning the belt; a spring for resiliently supporting the tensioning arm; and a connecting assembly for connecting the tensioning arm to the base member, wherein the connecting assembly comprises at least two base member connecting portions and at least two tensioning arm connecting portions which are connected to one another by an insertion and rotational movement; wherein, between a first base member connecting portion and a first tensioning arm connecting portion a first contact surface region is formed which is greater than a second contact surface region which is formed between a second base member connecting portion and a second tensioning arm connecting portion.

12 Claims, 3 Drawing Sheets

(56) References Cited

U.S. PATENT DOCUMENTS

| | | | | |
|---|---|---|---|---|
| 5,575,727 A * | 11/1996 | Gardner | F16H 7/1281 | 474/135 |
| 5,629,834 A * | 5/1997 | Kodama | H01L 23/467 | 165/122 |
| 5,734,554 A * | 3/1998 | Mitty | H01L 23/467 | 165/80.3 |
| 5,787,971 A * | 8/1998 | Dodson | H01L 23/467 | 165/121 |
| 5,803,850 A * | 9/1998 | Hong | F16H 7/1218 | 474/101 |
| 5,877,576 A * | 3/1999 | CoChimin | B22C 9/046 | 310/418 |
| 5,937,517 A * | 8/1999 | Smith | B23P 15/26 | 257/E23.102 |
| 6,009,938 A * | 1/2000 | Smith | H01L 21/4882 | 165/185 |
| 6,137,680 A * | 10/2000 | Kodaira | H01L 23/4093 | 165/104.34 |
| 6,184,600 B1 * | 2/2001 | Asao | F28F 3/02 | 165/47 |
| 6,217,470 B1 * | 4/2001 | Quintus | F16H 7/1218 | 474/101 |
| 6,310,771 B1 * | 10/2001 | Chien | H01L 23/3672 | 165/185 |
| 6,313,994 B1 * | 11/2001 | Tantoush | H01L 23/3672 | 165/185 |
| 7,384,355 B2 * | 6/2008 | Ayukawa | F16H 7/1218 | 474/109 |
| 8,413,713 B2 * | 4/2013 | Huang | F28D 15/0275 | 165/104.23 |
| 8,555,952 B2 * | 10/2013 | Huang | F28F 3/02 | 165/80.3 |
| 9,638,294 B2 * | 5/2017 | Buchen | F16H 7/12 | |
| 2001/0030853 A1 * | 10/2001 | Lee | H01L 23/4093 | 361/704 |
| 2001/0053289 A1 * | 12/2001 | Imanari | B29C 33/12 | 396/531 |
| 2002/0067599 A1 * | 6/2002 | Mann | H01L 23/3672 | 361/704 |
| 2004/0182542 A1 * | 9/2004 | Take | H01L 23/3672 | 165/80.3 |
| 2008/0132365 A1 * | 6/2008 | Boussaguet | F16C 13/006 | 474/136 |
| 2008/0308364 A1 * | 12/2008 | Huang | F16D 65/0006 | 188/218 R |
| 2009/0129103 A1 * | 5/2009 | Zhang | F21K 9/00 | 362/373 |
| 2009/0189723 A1 * | 7/2009 | Irgens | H01F 27/22 | 336/55 |
| 2010/0118496 A1 * | 5/2010 | Lo | F21V 15/013 | 361/710 |
| 2010/0259900 A1 * | 10/2010 | Chang | H01L 23/40 | 361/710 |
| 2010/0263850 A1 * | 10/2010 | Huang | F28F 3/02 | 165/185 |
| 2011/0290467 A1 * | 12/2011 | Huang | F28D 15/0275 | 165/182 |
| 2012/0058848 A1 * | 3/2012 | Lannutti | F16H 7/1218 | 474/135 |
| 2012/0115657 A1 * | 5/2012 | Antchak | F16H 7/1218 | 474/135 |
| 2013/0079185 A1 * | 3/2013 | Schauerte | F16H 7/1281 | 474/135 |
| 2013/0088871 A1 * | 4/2013 | Yun | F21V 5/007 | 362/249.01 |
| 2014/0069477 A1 * | 3/2014 | Haider | H01L 35/30 | 136/205 |
| 2015/0285344 A1 * | 10/2015 | Buchen | F16H 7/12 | 474/135 |
| 2015/0342091 A1 * | 11/2015 | Scharinger | H05K 7/20909 | 165/80.3 |
| 2016/0105082 A1 * | 4/2016 | Bradfield | H02K 9/22 | 310/54 |

FOREIGN PATENT DOCUMENTS

| | | |
|---|---|---|
| DE | 102011003113 A1 | 7/2012 |
| DE | 102014206716 A1 | 10/2015 |
| EP | 2573423 A1 | 3/2013 |

* cited by examiner

BELT TENSIONING DEVICE

CROSS-REFERENCE TO RELATED APPLICATIONS

This application claims priority to German Application No. DE 10 2015 115 750.0 filed on Sep. 17, 2015, which application is hereby incorporated herein by reference in its entirety.

BACKGROUND

A belt drive normally comprises an infinite belt and at least two pulleys, of which one can serve as a drive and one as an output of the belt drive. Such belt drives are especially used in internal combustion engines of a motor vehicle for driving auxiliary units, wherein a first pulley is arranged on the crankshaft of the internal combustion engine and drives the belt. Further belt pulleys are associated with the auxiliary units, as for example a water pump, a generator or an air conditioning compressor, and are rotatingly driven by the belt drive. In common belt drives the auxiliary units, which can also be referred to as accessories or ancillary assemblies, are designed as consumers, i.e. they are driven by the belt pulley of the crankshaft via the belt. In this case, the undriven side of the belt is arranged between the crankshaft and the unit, generally the generator, following in the circumferential direction of the belt. To ensure a sufficient belt wrap around the belt pulley, the belt is pretensioned by a tensioning roller of the belt tensioning device.

From EP 2 573 423 A1 a belt tensioning device is known for a belt drive of said type. The belt tensioning device comprises a base member on which a tensioning arm is pivotably supported. The belt tensioning device is designed such that in a mounted condition, the pivot axis of the tensioning arm is arranged inside the outer diameter of the belt pulley of the assembly.

Efforts to reduce fuel consumption and $CO_2$ emissions accompany the need to reduce the weight of vehicle components. Thus, in the field of belt tensioning devices attempts also are being made to reduce weight.

From the applicant's DE 10 2014 206 716 A1, a belt tensioning device for a belt drive is known that comprises a base member, a tensioning arm which is pivotable relative thereto, and a spring which resiliently supports the tensioning arm in the circumferential direction. The base member and the tensioning arm at least partly consist of plastics, so that the belt tensioning device, overall, comprises a low weight.

In particular in compactly designed belt tensioning devices, high rotational variations in the belt drive, which are caused when changing from engine operation to starter operation, can lead to a high friction power and corresponding thermal loads on the belt tensioning device.

SUMMARY

The present disclosure relates to a belt tensioning device for a belt drive. The belt tensioning device for a belt drive can be produced easily and cost-effectively and permits adequate heat dissipation, so that the belt tensioning device, more particularly meets the respective technical requirements for being used in a belt drive with a starter generator over a long service life.

A first solution is provided by a belt tensioning device for a belt drive comprising: a base member which can be fixed to a stationary component; at least one tensioning arm which is pivotably supported relative to the base member around a pivot axis; a tensioning roller for tensioning the belt, which tensioning roller is connected to the tensioning arm so as to be rotatable around a rotational axis; a spring by which the tensioning arm is resiliently supported in circumferential direction; as well as a connecting assembly for connecting the tensioning arm to the base member, wherein the connecting assembly comprises at least two circumferentially extending base member connecting portions and at least two circumferentially extending tensioning arm connecting portions which are connected to one another by an insertion and rotational movement; wherein, between a first base member connecting portion and a first tensioning arm connecting portion a first contact surface region is formed which is greater than a second contact surface region which is formed between a second base member connecting portion and a second tensioning arm connecting portion.

A second solution is provided by a belt tensioning device for a belt drive, comprising: a base member which is attachable to a stationary component; at least one tensioning arm which is pivotably supported relative to the base member around a pivot axis; a tensioning roller for tensioning the belt, which tensioning roller is connected to the tensioning arm so as to be rotatable around a rotational axis; a spring by which the tensioning arm is resiliently supported in the circumferential direction; as well as a connecting assembly for connecting the tensioning arm to the base member, wherein the connecting assembly comprises at least two circumferentially extending base member connecting portions and at least two circumferentially extending tensioning arm connecting portions which are connected to one another by an insertion and rotational movement; wherein the tensioning arm comprises an opening into which a driveshaft and/or a belt pulley of an assembly extends in the mounted condition, wherein a wall of the tensioning arm that surrounds the opening is provided with circumferentially distributed ribs, wherein the ribs comprise a greater thickness in the foot portion than in the head portion.

For both belt tensioning devices it is advantageous that they both permit adequate heat dissipation and that they are easy to produce. Because the connecting assembly is designed such that the tensioning arm and the base member can be connected to one another via a plug-in and rotational movement, assembly is easy and cost-effective. The larger contact surface region and the rib design involving a variable width along the height permit an adequate heat dissipation from the contact regions, thus, more particularly ensuring that the technical requirements regarding the use of the tensioning device in a belt drive with a starter generator are ensured over a long service life.

It is understood that both solutions are suitable for being used as alternatives or in combination with one another. Thus the first solution can comprise the rib design of the second solution. Vice versa, the second solution can comprise the design of the connecting assembly with differently sized contact surface regions of the first solution.

According to a first possibility, the belt tensioning device can be provided in the form of a one-arm tensioning device, i.e., it can comprise exactly one tensioning arm. In this case the tensioning arm is resiliently supported in circumferential direction via the spring means against the base member. According to a second possibility, the belt tensioning device can also be provided in the form of a two-arm tensioning device, i.e., it comprises exactly two tensioning arms. In this case the two tensioning arms are supported relative to one another in the circumferential direction by the spring means. Two-arm tensioning devices are used in belt drives in which a further auxiliary unit in the form of a starter generator is integrated into the belt drive, i.e., an electric motor which, depending on the operating conditions, can be operated as a starter or generator. It is to be understood that within the context of the present disclosure, all details referring to "a", "one" or "the" tensioning arm can also apply to a second tensioning arm.

The connecting assembly comprises a plurality of connecting portions associated with the base member and a plurality of connecting portions associated with the tensioning arm, which interact with each other. The base member connecting portions and the tensioning arm connecting portions are designed such that the tensioning arm and the base member can be connected to one another by an insertion (plug-in) movement and rotational movement. To that extent, said connection functions like a bayonet-type connection, thus ensuring that the belt tensioning device is easy to assemble. In the assembled condition, a respective contact surface region is formed between a base member connecting portion and an associated tensioning arm connecting portion. In this context, "contact surface region" refers to the region of mutual axial support and mutual surface overlap between a base member connecting portion and an associated tensioning arm connecting portion.

According to one aspect of the invention it is proposed that a first contact surface region between a first connecting portion of the base member and a first connecting portion of the tensioning arm is greater than a second contact surface region between a second connecting portion of the base member and a second connecting portion of the tensioning arm. In other words, the area of mutual overlap between the first connecting portions of the base member and the tensioning arm is greater than the area of overlap between the second connecting portions. In a preferred embodiment, the first contact surface region is at least 10% greater than the second contact surface region, more particularly at least 20%, optionally at least 30%, greater than the second contact surface region.

It is to be understood that the connecting assembly can also comprise three and more connecting portions between the base member and the tensioning arm, so that a correspondingly larger number of contact surface regions is formed. In respect of size, said further regions can correspond to the first contact surface regions or the second surface contact regions or their size may deviate from these.

The connecting assembly, which can also be designated as connecting mechanism, can be designed such that the tensioning arm can be inserted into the base member only in exactly one predetermined rotational position. This simplifies the assembly procedure and shortens the assembly time. Such error-avoiding principles are also referred to as Poka Yokes. For this, it is possible that the connecting portions are distributed irregularly along the circumference and/or comprise different circumferential extensions.

According to an example, a recess is formed between each two circumferentially adjoining base member connecting portions. The tensioning arm connecting portions are provided in the form of radial projections which correspond to the recesses. Thus, the tensioning arm can be axially introduced into the base member in a rotational position in which the radial projections of the tensioning arm are arranged in the circumferential regions of the recesses of the base member. It is understood that the kinetic reversal of the connecting portions is also possible, i.e., the recesses are associated with the tensioning arm and the radial projections with the base member.

According to an example, the base member and/or the at least one tensioning arm comprises a respective opening into which a drive member of an assembly can extend in the mounted condition. An assembly, i.e., aggregate in the context of the present disclosure shall include any assembly that is driveable by the belt or can drive the belt, in particular an auxiliary unit or component as mentioned above. The drive member, for instance, can be a driveshaft and/or a belt pulley of the assembly. The tensioning arm wall surrounding the opening can be provided with ribs around at least part of its circumference. More particularly, the ribs have two functions, i.e., they remove any friction heat which may develop under operational conditions in the belt tensioning device, wherein for an effective heat removal it is particularly advantageous if the ribs comprise a variable thickness over their height. Furthermore, the ribs contribute to a targeted air supply in direction towards the assembly to effectively cool the same, to which assembly the belt tensioning device is attached. With reference to the longitudinal axis of the opening, the ribs can extend straight, angular, or arched. The term "angular" is to comprise all shapes in which the flanks of the ribs or parts thereof extend non-parallel to the longitudinal axis. More particularly, the ribs can also be formed helically or blade-like.

According to an embodiment, the ribs comprise a variable thickness over the height in the foot portion, wherein the height of the foot portion having a variable thickness amounts to at least 10%, more particularly at least 20% of the total height of the rib. As a result of the relatively long portion with a variable thickness which decreases radially inwardly towards the free end of the rib, the heat of the tensioning arm can be very effectively introduced from the wall region into the ribs and from there dissipated into the environment. Overall, this reduces the thermal load on the belt tensioning device, with the service life being increased accordingly. In the head portion the ribs can comprise a constant thickness over the height, wherein the height of the head portion with a constant thickness can amount to at least 50% of the total height of the rib, for example.

The ribs can extend in the axial direction with reference to the pivot axis or at least they can comprise a gradient component in the axial direction. Furthermore, it can be proposed that—in a cross-sectional view—a smallest distance formed between two circumferentially adjoining ribs in the head portion is greater than a smallest distance formed between two ribs in the foot portion.

A plurality of ribs is provided around the circumference, wherein the wall of the tensioning arm is provided with ribs around a circumferential portion of at least 60°, more particularly of at least 90°, around a longitudinal axis of the opening. It is also possible that the wall of the tensioning arm comprises not only one circumferential portion provided with ribs, but a plurality of circumferential portions, i.e., segments which are provided with ribs. It is also possible for the inner wall of the tensioning arm to be ribbed around the entire inner circumference. In this embodiment, a total number of 20 to 30 ribs can be provided around the circumference.

Between the base member and the tensioning arm, a bearing arrangement can be provided for rotatably supporting the tensioning arm relative to the base member around the pivot axis. To achieve a compact design, it is proposed more particularly that the ratio of the bearing diameter relative to the axial length of the belt tensioning device (without tensioning roller) is greater than 1.5, possibly greater than 2.0. The bearing arrangement can be provided in the form of a plain bearing and comprises at least one first bearing element which is associated with the base member and at least one second bearing element which is associated with the tensioning arm, with pairs of sliding faces being formed between the first and the second bearing elements. More particularly, it is proposed that the bearing arrangement comprises an axial bearing and a radial bearing. Axial bearings and radial bearings can be functionally separated, i.e., the axial bearing can serve exclusively for accommodating axial forces between the tensioning arm and the base member, whereas the radial bearing can serve exclusively for receiving radial forces. However, it is to be understood that combined axial/radial bearing can also be used. The first and the second bearing elements can be produced from different materials. More particularly, one of the bearing elements may consist of a metallic material and the other one of the bearing elements of plastics, wherein the association with the tensioning arm and base member respectively is arbitrary.

According to an example, the bearing elements of the base member are arranged segment-like around the circumference, i.e., between two circumferentially adjoining bearing elements there is formed a recess for inserting the tensioning arm. Thus, an axial assembly of the tensioning arm relative to the base member is enabled. Furthermore, the bearing elements can be pre-fabricated as integral components of the base member so as to form one unit. For this the bearing elements can be produced from a low-friction plastic material which differs from the basic material of the base member and can be injection moulded thereinto during production.

The material for the base member can in principle be any material and can be selected to meet the respective requirements. For example, the tensioning arm and/or the base member can be produced out of a metal-based material, for instance out of an aluminium casting. Equally, the tensioning arm and/or the base member can be made of a plastic material. It is possible that the tensioning arm and the base member are made of the same material or of different materials or, one of the components is produced out of plastics and the other one out of a metal material.

Production of the tensioning arm and/or the base member out of plastics includes in particular the possibility of the basic material being plastics into which further elements consisting of a different material can be integrated. According to a further example it is proposed that the base member and/or the tensioning arm are produced out of several plastic materials which comprise different material properties. More particularly, production can take place by using a multi-component injection moulding process, wherein different plastic materials are produced in one tool in one operation. To ensure excellent heat dissipation out of the bearing region it can be proposed that additives be added to the basic material, whose thermal conductivity is higher than that of the basic material. The basic material for the base member and/or the tensioning arm can be fibre-reinforced plastics, for example glass-fibre-reinforced and/or carbon-fibre reinforced plastics.

Furthermore, it is possible that the bearing element associated with the base member uses a bearing material which comprises a higher thermal conductivity than the basic material of the base member. For achieving a good heat dissipation into the base member it is advantageous if the materials used—starting from the tensioning arm bearing element via the base member bearing element to the basic material of the base member—comprise a decreasing thermal conductivity.

In the case that plastics are used as basic material for the base member and/or for the tensioning arm, at least one reinforcing element out of a metal material can be provided which is surrounded by injected plastic material. "At least one reinforcing element" means that, in the base member and in the tensioning arm respectively, one or several reinforcing elements can be provided. As far as in the present disclosure reference is made to "a", "one" or "the" reinforcing element, this of course also applies to each further reinforcing element. For instance, the reinforcing element can be provided in the form of a bushing which is surrounded by injected material. More particularly, the tensioning arm can comprise a reinforcing bushing or a bearing element out of a metallic material by which the tensioning arm is rotatably supported on the bearing means of the base member. Furthermore, the base member can comprise reinforcing bushings consisting of a metal-based material for being fixed to a stationary component.

The spring means can be provided in the form of at least one, or exactly one, spring which extends around the longitudinal axis. The spring can be formed as a helical spring whose centreline at least substantially extends parallel to the pivot axis A, with the helical spring comprising maximally, i.e. at most three full windings, more particularly at most 2.5 full windings, in particular at most two full windings, or less. For a compact design of the belt tensioning device it is advantageous if the ratio of the nominal diameter of the helical spring relative to the axial length of the helical spring, in the mounted condition, is greater than 3.0, more particularly greater than 4.0, possibly greater than 5.0. Thus, the belt tensioning device can be attached at the end side of the assembly without requiring additional installation space in the surroundings of the assembly. Alternatively, the spring means can be provided in the form of a yoke spring or torsion spring which extends in the circumferential direction around less than one full turn. It is also possible for the spring means to comprise one or several helical springs whose spring centre line, in the mounted condition of the spring, extends in the circumferential direction around the pivot axis A. An advantage of said example is that, because of its specific size ratios, it has a particularly compact design and, if plastics are used, it comprises a particularly light weight. Overall, if plastics are used, the belt tensioning device comprises a particularly low mass inertia, so that the length of extension of the strand force is reduced.

SUMMARY OF THE DRAWINGS

Examples will be explained below with reference to drawings wherein.

DETAILED DESCRIPTION

Figure 1:
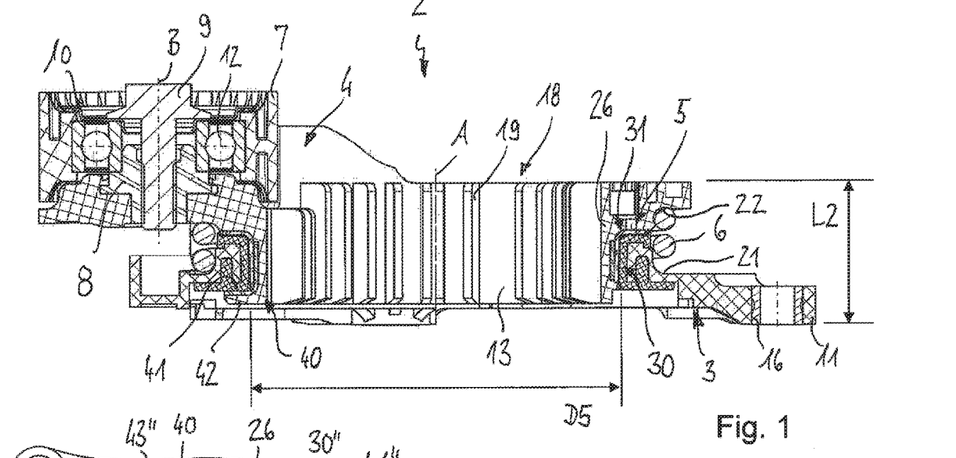
FIG. 1 shows a first example belt tensioning device in a longitudinal section.
Figures 2, 3:
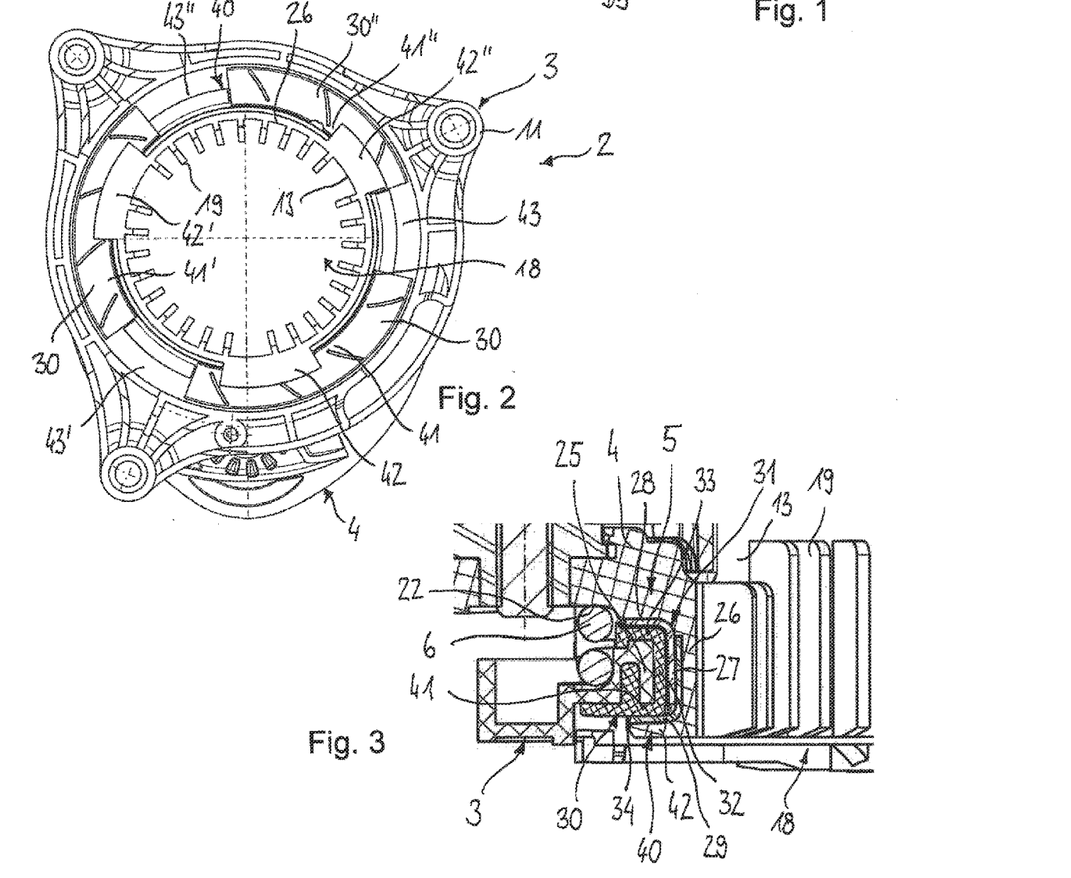
FIG. 2 shows the belt tensioning device according to FIG. 1 in an axial view from below.
FIG. 3 shows a detail of the belt tensioning device according to FIG. 1 in an enlarged view.

FIGS. 1 to 3 which will be described jointly below show an a first example belt tensioning device 2.

The belt tensioning device 2 comprises a base member 3 which can be fixed to an assembly (not shown) or to a component connected to the assembly, a tensioning arm 4 which is supported relative to the base member 3 by a bearing arrangement so as to be pivotable around a pivot axis A, and a spring 6 which resiliently supports the tensioning arm 4 against the base member 3 in a circumferential direction. For mounting, the base member 3 has three flange portions 11 projecting radially outwardly and having bores through which screws can be passed for attaching the base member 3 to the assembly, i.e., a stationary component.

At a free end portion, the tensioning arm 4 carries a tensioning roller 7 which is rotatable around a rotational axis B extending parallel to the pivot axis A. In that respect, the tensioning arm 8 can also be referred to a roller carrier. The tensioning roller 7 is rotatably supported on a bearing journal 8 of the tensioning arm 4 and attached thereto by a screw 9. Furthermore, a disc 10 is provided axially next to the tensioning roller 7, which protects the bearing 12 against penetrating dirt. The tensioning arm 4 is axially and radially supported relative to the base member 3 via the bearing arrangement 5 so as to be rotatable around the pivot axis A. The tensioning arm 4 is connected to the base member 3 via a connecting assembly 40. The tensioning arm 4 is at least approximately arranged in a plane with the bearing arrangement 5, so that the axial size of the device is small.

The spring 6 is provided in the form of a helical spring whose spring centreline extends substantially parallel to the pivot axis A. The first end of the helical spring 6 is bent radially outwardly and is supported on a corresponding abutment face of the base member 3 in circumferential direction. The opposite second end of the helical spring 6 is also bent radially outwardly and is supported on a corresponding abutment face of the tensioning arm 4 in circumferential direction. The helical spring 6 effects a spring-tensioning of the tensioning arm 4 relative to the base member 3 so that the belt of the belt drive is pretensioned.

The helical spring 6 is arranged coaxially outside of the bearing arrangement 5 for supporting the tensioning arm 4. The helical spring 6 and the bearing 5 axially overlap each other at least with partial portions in order to keep the design space small in the axial direction. The helical spring 6 has a relatively large diameter with reference to its axial length. The number of windings is greater than one and smaller than two. In an example, the circumferential extension of the helical spring ranges between 540° and 690°. The ratio of the nominal diameter D6 of the helical spring 6 to the axial length L6 is, in the mounted condition of the helical spring, in which the helical spring is axially pretensioned, between 3.0 and 9.0, more particularly between 5.0 and 8.0. It is to be understood that said values are not limiting and that other values can be used. Within said ranges, all intermediate ranges can be considered. Furthermore, it should be understood that the named ratio of the spring diameter to the axial length in the mounted condition also depends on the wire diameter of the spring wire. The larger the wire diameter, the smaller the axial length of the helical spring 6 can be selected.

The belt tensioning device 2 and the tensioning arm 4 can comprise a through-opening which is arranged coaxially to the longitudinal axis 4. In this manner, the base member 3 can easily be screwed to an assembly, with an end of the driveshaft optionally entering the through-opening 18. Overall, an axially very short design is achieved. At least in one portion of the through-opening 18, a smallest internal diameter of the through-opening D18 can be greater than an outer diameter of the driveshaft (not shown) and more particularly also greater than an outer diameter of the belt pulley connected to the driveshaft (not shown).

The base member 3 comprises an annular portion 25 for supporting the tensioning arm 4. From the annular portion 25 a flange portion, which serves as an axial support face 21 for the spring 6, extends radially outwardly. Several attaching portions 11 project radially outward from the flange portion, each attaching portion 11 having a respective bore for attaching the base member 3 on the stationary component. The attaching portions 11 are arranged on a larger diameter relative to the flange portion and relative to the spring 6. Thus, any forces and torque acting on the base member 3 can be well-supported and introduced into the component to which the belt tensioner is attached.

The helical spring 6 is arranged with axial pretension between the support face 21 of the base member 3 and an axially opposed support face 22 of the tensioning arm 4. In this way, the tensioning arm 4 is loaded axially away from the base member 3, with both said parts being axially supported against each other via the connecting assembly 40. The support face 21 for the spring 6 extends over a circumferential portion of the base member 3. In this case at least a partial portion of the support face 21 is arranged in a plane which has an axial overlap with the driveshaft. In the circumferential direction, the support face 21 of the base member 3, which is adapted to the incline of the helical spring 6, can be ramp-shaped.

The belt tensioning device 2 is designed such that, from the view of the aggregate, the bearing 5 of the tensioning arm 4 at the base member 3 is positioned behind the belt plane. The belt plane is the plane which is formed by the belt centre in the mounted condition. The bearing arrangement 5 comprises one or several first bearing elements 30 which are associated with the base member 3, and at least a second bearing element 31 which is associated with the tensioning arm 4. To achieve a compact design of the belt tensioning device 2 it is advantageous if the ratio of the bearing diameter D5 to the axial length L2 of the belt tensioning device 2 (without tensioning pulley) is larger than 1.5, possibly larger than 2.0.

The first bearing elements 30—if viewed in half a longitudinal section—are approximately C-shaped and, on the radial inside, comprise a cylindrical portion 32 from which two flange portions 33, 34 project radially outward. Thus, the first bearing elements 30 engage the annular portion 25 of the base member 3 in a form-locking way. The first flange portion 33, which faces the tensioning arm 4, forms an axial bearing face for supporting the tensioning arm 4 in a first axial direction, whereas the second flange portion 34, which is axially spaced from the first flange portion 33, forms an axial bearing face for the tensioning arm 4 in an opposite second direction. The cylindrical portions 32 form a radial bearing face for the tensioning arm 4.

The first bearing elements 30 and the base member 3 are integrally produced, more particularly by injection moulding. In this case, the bearing elements 30 are made from a different plastic material than the base member 3. The bearing material comprises a low-friction plastic material, for example a high-tensile polyamide with a percentage of pulytetra-fluorethylen (PTFE) with a strength of for example between 2,000 MPa and 4,000 MPa. Relative thereto, the basic material of the base member 3 can be a fibre-reinforced polyamide with a strength of for example between 15,000 MPa and 22,000 MPa. By using the multi-component injection moulding process, the unit of the base member 3 with first bearing elements 30 can be produced easily and cost-effectively with one tool in one operation.

The tensioning arm 4 has a sleeve portion 26 onto which the bearing element 31 is pressed which is formed as a bearing bushing. The tensioning arm 4 and the bearing bushing (insert) are connected to one another in a planar way so as to form a hybrid part so that any heat occurring under operational conditions is introduced in a planar way into the tensioning arm 4. The bearing bushing 31 is especially a formed sheet metal part and can for example be produced from aluminium or an aluminium alloy. A bushing portion 27 of the bearing bushing and the cylindrical portions 32 of the first bearing elements 30 form a radial bearing, while a flange portion 28 of the bearing bushing 31 and the flange portions 33 of the first bearing elements 30 form an axial bearing. In this case, the flange portion 28 of the bearing bushing 31 and the associated flange portion 33 of the first bearing element 30 contact one another in a planar way, just like the two flange portions 28, 33 3, 4 are in planar contact with the associated components, thus permitting a good heat dissipation from the friction area. The same also applies for a lower flange portion 29 of the bearing element 31 which, on one side, is in planar contact with the tension arm connecting portion 42 and, on the other side is in planar contact with the flange portion 43 of the bearing element 30.

The connecting assembly 40 for connecting the tensioning arm 4 with the base member 3 can be seen in particular in FIG. 2. The connecting assembly 40 is designed in a bayonet lock manner and comprises a plurality of circumferentially distributed first connecting portions 41, 41', 41" which are associated with the base member 3, and a plurality of second connecting portions 42, 42', 42" cooperating therewith, which are associated with the tensioning arm 4. In the mounted condition, a respective contact surface region is formed between a base member connecting portion 41, 41', 41" and an associated tensioning arm connecting portion 42, 42', 42".

In the present example, it is proposed—as can be seen in FIG. 2—that a first contact surface region formed between a first connecting portion 41 of the base member 3 and a first connecting portion 42 of the tensioning arm 4 is greater than the second contact surface region formed between the second base member connecting portion 41' and the second tensioning arm connecting portion 42'.Further, the first contact surface region formed between the first connecting portion 41 of the base member 3 and the first connecting portion 42 of the tensioning arm 4 is greater than the third contact surface region formed between the third base member connecting portion 41" and the third tensioning arm connecting portion 42". The area of the mutual overlap between the first connecting portions 41, 42 of the tensioning arm 4 and the base member 3 can be more than 20% greater than the area of overlap between the second and third connecting portions 41', 42'; 41", 42". This is achieved in that the first tensioning arm connecting portion 42 comprises a greater circumferential extension than the second and third tensioning arm connecting portion 42', 42". By changing the surface contact geometry, more particularly, by enlarging the contact surface pairs between the tensioning arm connecting portion and the base member connecting portion, which surface pairs are subjected to the highest loads under operational conditions, the surface pressure can be reduced, which leads to less heat being developed and to a reduction in wear.

The connecting portions 41, 41', 41" of the base member 3 are formed by the bearing elements 30, 30', 30" and, more particularly, form parts of the flange portions 34, 34', 34" of the bearing elements 30, 30', 30". Thus, the bearing elements 30, 30', 30" have two functions, i.e., they rotationally support the tensioning arm 4 relative to the base member 3 and axially support the tensioning arm connecting portions 42, 42', 42" and thus the connection of the two components 3, 4 with each other.

A respective recess 43, 43', 43" is formed between each two circumferentially adjoining base member connecting portions 41, 41', 41". The tensioning arm connecting portions 42, 42', 42" are provided in the form of radial projections corresponding to the recesses 43, 43', 43". The tensioning arm 4 therefore can be axially introduced into the base member 3 in a rotational position where the radial projections of the tensioning arm are arranged in the circumferential regions of the recesses 43, 43', 43" of the base member 3. This makes it possible that the tensioning arm 4 and the base member 3 can be connected to one another by an insertion and rotational movement.

In a first relative rotational position, which can also be referred to as a bayonet position, the base member 3 and the tensioning arm 4 can be axially inserted into one another. Once the projections 42, 42', 42" of the tensioning arm 4 have been completely passed through the recesses 43, 43', 43", the tensioning arm 4 can be rotated into a second relative rotational position relative to the base member 3. In this second position, the projections 42, 42', 42" of the tensioning arm 4 are axially supported on the base member connecting portions 41, 41', 41" and on the bearing elements 30, 30', 30" respectively. In this position, the tensioning arm 4 and the base member 3 are axially fixed to one another and are axially pretensioned relative to one another via the spring 6. In order to prevent these two components 3, 4 from rotating unintentionally back into the bayonet position, it is possible to provide a securing pin (not shown) which serves as an anti-rotation stop.

The connecting assembly 40 is designed such that the tensioning arm 4 and the base member 3 can only be plugged, i.e., inserted into one another in the first rotational position (bayonet position). This is achieved in that the tensioning arm connecting elements 41, 41', 41" and the base member connecting elements 42, 42', 42" are irregularly distributed around the circumference and are accurately aligned relative to one another in only one relative rotational position. This design simplifies the assembly procedure and prevents an inaccurate assembly.

The basic material for the base member 3 and for the tensioning arm 4 can be a high-strength fibre-reinforced plastic material, for instance a glass-fibre reinforced and/or carbon-fibre reinforced polyamide. Furthermore, in the base member 3 and in the tensioning arm 4 there are provided reinforcing elements made from a different material. More particularly, the base member 3 comprises bushings 16 at the attaching flanges 11, which bushings 16 made of a metal material at the attaching flanges 11 and surrounded by injection-moulded plastics. The tensioning arm 4 also comprises a reinforcing bushing 8 in the form of a bearing journal which is also surrounded by the basic plastic material and serves as carrier for the bearing of the tensioning roller 7.

As described above, the opening 18 of the tensioning arm 4 is designed such that in the mounted condition the driveshaft and belt pulley respectively of an assembly (not illustrated) can extend into said opening 18. The wall 13 of the tensioning arm 4 surrounding the opening 18 is provided with circumferentially distributed ribs 19. The ribs fulfil in particular two functions: namely, they remove any friction heat occurring under operations conditions out of the tensioning arm 4; and, furthermore, the ribs 19 contribute to a targeted supply of air to the assembly for effectively cooling same, to which assembly the belt tensioning device is attached.

Figure 4:
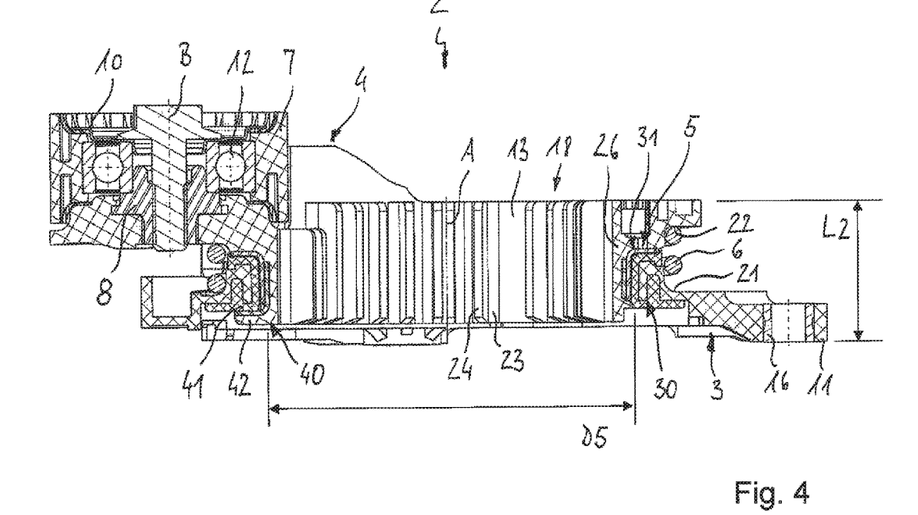
FIG. 4 shows a second example belt tensioning device in a longitudinal section.
Figure 5:
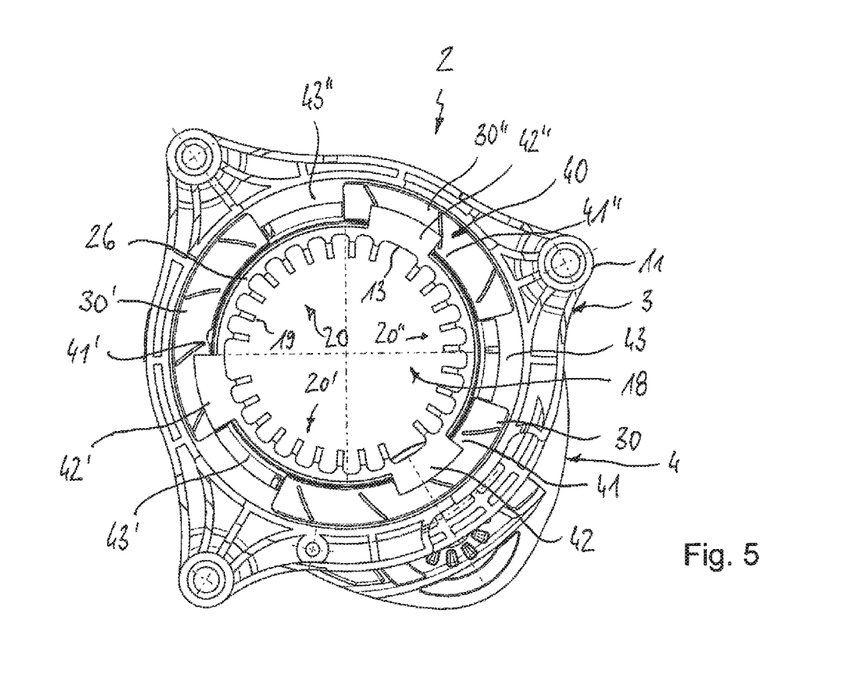
FIG. 5 shows the belt tensioning device according to FIG. 4 in an axial view from below.
Figure 6:
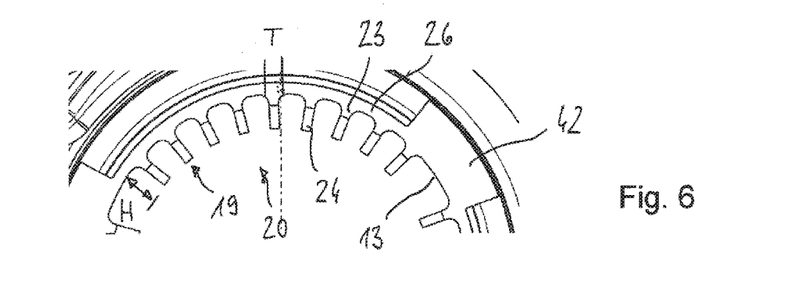
FIG. 6 shows the rib assembly according to FIG. 5 in the form of a detail.

FIGS. 4 and 6, which are described jointly below, show an inventive belt tensioning assembly 2 in a second example which largely corresponds to the example according to FIGS. 1 to 3, so that, as far as common features are concerned, reference is made to the above description. Identical details or details corresponding to one another have been given the same reference numbers as those used in FIGS. 1 to 3.

The present example is characterised in that the ribs 19 provided at the wall 13 of the tensioning arm 4 comprise a thickness D23 in one foot portion 23 which is greater than in a head portion 24. As a result of the thickened foot portions 23, the heat of the tensioning arm 3 can very effectively be introduced from the wall region into the ribs 19 and from there given off into the environment. Excessive energy is channelled and taken from the tensioning arm 4 to the surface via the widest possible connecting faces in the base of the ribs 19. In consequence, the thermal energy can be collected and by convection given off into the environment. This design feature can be referred to as the "root concept." Overall, the thermal load of the belt tensioning device 2 is thus reduced, with the service life being increased accordingly.

As can be seen in particular in FIG. 6, the ribs 19 in the foot portion 23 comprise a variable thickness T along the height H, which is achieved in that, in a cross-sectional view, the foot portions 23 are rounded. The height of the foot portion 23 with a variable thickness amounts to at least 20% of the total height H of the rib 19 in the present example. In the head portion, the ribs 19 comprise a constant thickness along the height, wherein the height of the head portion 24 with a constant thickness amounts to at least 50% of the total height H of the rib 19 in the present example. The ribs 19 extend in the axial direction. The smallest distance formed in the head portion 24 between two circumferentially adjoining ribs 19 is greater than the smallest distance formed in the foot portion 23. Thus, a good heat dissipation is ensured in the head regions. In the present embodiment the ribs 19 are distributed along the entire circumference. In particular, three segments are provided, each having nine ribs 19, with a gap being formed between each two rib segments 20.

Figure 7:
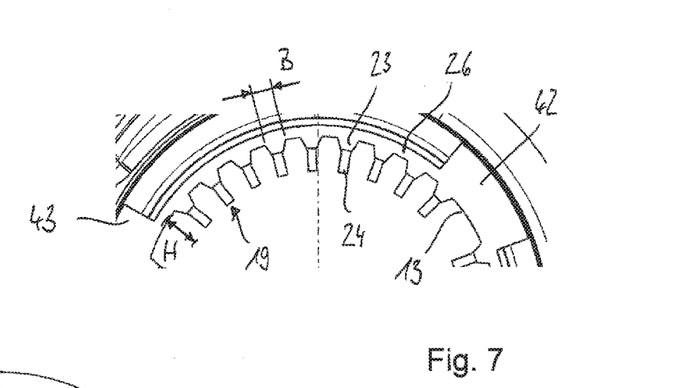
FIG. 7 is a detail of a further example belt tensioning device with an alternative rib design.

FIG. 7 shows a belt tensioning device with a modified rib shape. In comparison with the rib shape according to the example in FIGS. 4 and 6, the foot portions 23 have the shape of a truncated pyramid (instead of being round) in a cross-sectional view. Besides this, the example according to FIG. 7 corresponds to that according to FIGS. 4 to 6, so that, as far as further details are concerned, reference is made to the above description. In this context, identical details or details corresponding to one another having been given the same reference numbers as those in FIGS. 4 to 6 and 1 to 3 respectively.

Figure 8:
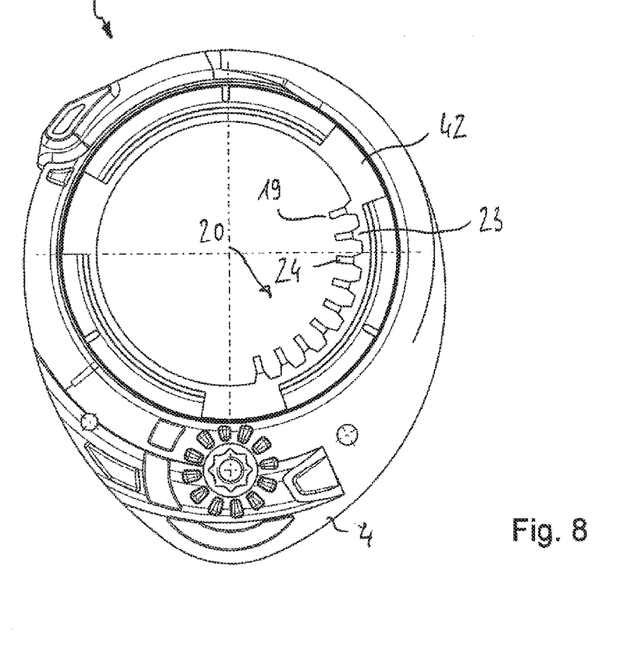
FIG. 8 shows a further example belt tensioning device in an axial view from below with an alternative rib design.

FIG. 8 shows a belt tensioning device in a further example, again with a modified rib arrangement, which largely corresponds to that according to FIG. 7 and FIGS. 1 to 6 respectively, so that as far as common features are concerned, reference is made to the above description. Again, identical details or details corresponding to one other have been given the same reference numbers as those in FIGS. 1 to 6.

The present embodiment according to FIG. 8 is characterised in that the wall 13 of the tensioning arm 4 is provided with ribs 19 only in a partial region, i.e. it comprises only one rib segment 20, which extends across a circumferential portion of slightly more than 90° around the longitudinal axis A.

It is to be understood that the invention is not restricted to the above-described examples, but that further examples are possible. More particularly, the example according to FIGS. 1 to 3 comprising a connecting assembly with differently sized contact surface regions can also be provided with rib arrangements according to one of the examples according to FIGS. 4 to 8. Furthermore, it is possible that the belt tensioning devices can also be provided with a cover disc which is attached from below onto the bearing assembly 5 and the connecting assembly 13 respectively to protect same against dirt.

Overall, the inventive belt tensioning device 2 has the advantage of offering good heat dissipation conditions and thus a longer service life.

The invention claimed is:

1. A belt tensioning device for a belt drive, comprising:
a base member which is attachable to an assembly having a drive shaft and a belt pulley;
at least one tensioning arm which is pivotably supported relative to the base member around a pivot axis;
a tensioning roller for tensioning the belt, which tensioning roller is connected to the tensioning arm so as to be rotatable around a rotational axis;
a spring by which the tensioning arm is resiliently supported in circumferential direction; and
a connecting assembly for connecting the tensioning arm to the base member;
wherein the connecting assembly comprises at least two circumferentially extending base member connecting portions and at least two circumferentially extending tensioning arm connecting portions which are connected to one another by an insertion and rotation movement; and
further wherein the tensioning arm comprises an opening that is configured such that at least one of the drive shaft and the belt pulley of the assembly are extendable into said opening in a mounted condition, wherein a wall of the tensioning arm that surrounds the opening is provided with circumferentially distributed ribs, wherein the ribs comprise a greater thickness in a foot portion than in a head portion;
wherein in the mounted condition a first contact surface region formed between a first base member connecting portion and a first tensioning arm connecting portion is at least 10% greater than a second contact surface region formed between a second base member connecting portion and a second tensioning arm connecting portion.

2. The belt tensioning device according to claim 1,
wherein between two circumferentially adjoining base member connecting portions a recess is formed;
the at least two circumferentially extending tensioning arm connecting portions are provided in the form of radial projections; and
the tensioning arm is configured to be axially introduced into the base member in a rotational position in which the radial projections of the tensioning arm are arranged in the circumferential region of the recesses of the base member.

3. The belt tensioning device according to claim 1, wherein the base member connecting portions and the tensioning arm connecting portions are designed such that the tensioning arm and the base member can be inserted into one another in exactly one predetermined rotational position.

4. The belt tensioning position according to claim 1, wherein, in the foot portion, the ribs comprise a variable width along a height, wherein the height of the foot portion with a variable thickness amounts to at least 10% of the total height of the rib.

5. The belt tensioning device according to claim 1,
wherein, in the head portion, the ribs comprise a constant thickness along a height, and
wherein the height of the head portion with a constant thickness amounts to at least 50% of the total height of the rib.

6. The belt tensioning device according to claim 1, wherein a smallest distance formed between two adjoining ribs in the head portion is greater than a smallest distance formed between two adjoining ribs in the foot portion.

7. The belt tensioning device according to claim 1, wherein, at the wall of the tensioning arm, the ribs extend around a circumferential portion of at least 60 around the pivot axis.

8. The belt tensioning device according to claim 1,
wherein a bearing arrangement is provided between the base member and the tensioning arm for rotatably supporting the tensioning arm relative to the base member around the pivot axis;
wherein the bearing arrangement comprises at least one bearing element associated with the base member and at least one bearing element associated with the tensioning arm;
wherein one of the bearing elements is produced from a metal-based material and the other one of the bearing elements is produced from a plastic material.

9. The belt tensioning device according to claim 1, wherein the base member and the tensioning arm are produced from different materials, wherein at least one of the base member and the tensioning arm is at least partially produced from plastics.

10. The belt tensioning device according to claim 9, wherein the at least one of the base member and the tensioning arm is produced from glass fibre reinforced plastics.

11. The belt tensioning device according to claim 1, wherein the bearing element associated with the base member is produced from a bearing material which comprises a higher thermal conductivity than the basic material of the base member.

12. The belt tensioning device according to claim 1,
wherein the spring is provided in the form of a helical spring whose spring axis, in the built-in condition, extends at least substantially parallel to the pivot axis, wherein the helical spring comprises at most three full windings;
wherein the ratio of nominal diameter of the helical spring relative to the axial length of the helical spring is greater than 3.0 in the built-in condition.

* * * * *